(12) United States Patent
Ruan

(10) Patent No.: US 12,303,019 B2
(45) Date of Patent: May 20, 2025

(54) REPLACEMENT BRUSH HEAD AND ORAL HYGIENE DEVICE

(71) Applicant: Shenzhen Ya Bei Kang Technology Co., Ltd, Shenzhen (CN)

(72) Inventor: Xiaoli Ruan, Shenzhen (CN)

(73) Assignee: Shenzhen Ya Bei Kang Technology Co., Ltd, Shenzhen (CN)

( * ) Notice: Subject to any disclaimer, the term of this patent is extended or adjusted under 35 U.S.C. 154(b) by 328 days.

(21) Appl. No.: 17/894,649

(22) Filed: Aug. 24, 2022

(65) Prior Publication Data
US 2023/0301423 A1 Sep. 28, 2023

(30) Foreign Application Priority Data

Mar. 22, 2022 (CN) .......................... 202210280571.X

(51) Int. Cl.
*A46B 5/00* (2006.01)
*A61C 17/22* (2006.01)

(52) U.S. Cl.
CPC .......... *A46B 5/0095* (2013.01); *A61C 17/222* (2013.01)

(58) Field of Classification Search
CPC ... A61C 17/222; A61C 17/26; A61C 17/3481; A61C 17/3436; A61C 17/34; A61C 17/22; A61C 17/3461; A46B 5/0095; A46B 5/00

USPC ....................................................... 15/167.1
See application file for complete search history.

(56) References Cited

U.S. PATENT DOCUMENTS

| 7,987,522 | B2* | 8/2011 | Morgan | F41H 3/00 2/244 |
| 11,207,162 | B1* | 12/2021 | Liu | A61C 17/26 |
| 2004/0049868 | A1* | 3/2004 | Ng | A61C 17/34 15/22.1 |
| 2010/0170051 | A1* | 7/2010 | Kressner | A61C 17/222 15/22.1 |
| 2018/0132987 | A1* | 5/2018 | Deane | A61C 17/221 |

FOREIGN PATENT DOCUMENTS

CN 111759079 A * 10/2020 ......... A46B 11/0062

* cited by examiner

*Primary Examiner* — Katina N. Henson

(57) ABSTRACT

The present invention provides a replacement brush head, comprising: a bristle head, a housing, a transmission shaft and a tail cover, the transmission shaft is arranged inside the housing, and the bristle head is arranged in a transmission manner at a top end of the housing through the transmission shaft, and the tail cover is arranged at a tail end of the housing. The replacement brush head and oral hygiene device provided by the present invention converts a linear motion of the transmission shaft device into a rotary motion, effectively controlling the rotation angle and swing frequency of the brush head, realizing the smooth transmission of the brush head, and also reducing the noise caused by the transmission process, and has the technical effect of convenient, fast and low-cost assembly.

1 Claim, 11 Drawing Sheets

REPLACEMENT BRUSH HEAD AND ORAL HYGIENE DEVICE

CROSS REFERENCE TO RELATED APPLICATION

This application claims priority benefit of Chinese Invent Application No. 202210280571.X, filed on Mar. 22, 2022, and the entire contents of which are incorporated herein by reference.

TECHNICAL FIELD

The present invention relates to the technical field of oral hygiene supply device, in particular to a replacement brush head and an oral hygiene device.

BACKGROUND

In daily life, automatic cleaning and nursing devices are more and more widely used, and oral hygiene devices can clean teeth more conveniently and effectively. The oral hygiene device is generally divided into a replaceable brush head and a handle, and a mechanical movement of the handle is transmitted to the brush head, so as to cause the brush head to move, and then bristles on the brush head to swing to realize the function of cleaning the teeth. However, control degrees of swing arc and swing frequency of the oral hygiene device on the market are different, resulting in different effects on the cleaning degree, of the oral cavity. As a direction of technical improvement and development in this field, it is an important that how to better control and adjust swing arc and swing frequency of the brush head such that the transmission is more stable and product performance is improved to achieve a better user experience.

SUMMARY

The present invention provides a replacement brush head and an oral hygiene device, which solve the technical problems of difficulty in controlling the rotation angle, swing frequency and smooth transmission of the brush head, loud noise in the transmission process and high cost in assembly assistance.

In order to achieve the above object, the present invention provides the following technical solutions:

A replacement brush head comprises: a bristle head 5, a housing 6, a transmission shaft 3 and a tail cover 1, the transmission shaft 3 is arranged inside the housing 6, and the bristle head 5 is arranged in a transmission manner at a top end of the housing 6 through the transmission shaft 3, and the tail cover 1 is arranged at a tail end of the housing 6.

Preferably, the transmission shaft 3 includes a transmission rod 30, a top end of the transmission rod 30 is provided with a transmission convex column 32, and the transmission rod 30 is provided with a cross guide groove 31.

Preferably, a damping spring 4 is sheathed on the transmission rod 30.

Preferably, a tail end of the transmission rod 30 is composed of a peripheral wall and a cavity formed by the peripheral wall, and a plane limiter 36 is provided on an outer side of the peripheral wall, and an assembly positioning groove 35 is provided on an outer side surface adjacent to the plane limiter 36.

Preferably, the peripheral wall is further provided with a glue dispensing port 33, and an inner side of the peripheral wall is further provided with a glue overflow groove 34.

Preferably, a guide rib 61 and a spring limiting rib 62 are provided on an inner side of the housing 6.

Preferably, an outer wall of the tail cover 1 is provided with a convex point 11 and a rib 15 on one side, and an elastic damping arm 13 and the boss 14 on an opposite side, and a recess 12 is provided at a bottom end of the tail cover 1.

Preferably, the top end of the housing 6 is provided with a bristle head defining rib 64, a bristle head positioning column 63 and a fixing hole 65 at a connection with the bristle head 5.

Preferably, a bottom step of the bristle head 5 is provided with a central hole 51 and an eccentric transmission hole 52, a side of the step is provided with a limiting groove 53, and the bristle head is provided with soft bristles 54.

An oral hygiene device comprises the replacement brush head of any of the above-mentioned embodiments, a magnetic electroplated iron block 2 and a handle 8, and the handle is provided therein with a handle transmission shaft 81, the handle transmission shaft 81 is connected to the replacement brush head in a transmission manner through the magnetic electroplated iron block 2.

By implementing the above technical solutions, the following technical effects are achieved: the replacement brush head and oral hygiene device provided by the present invention converts a linear motion of the transmission shaft device into a rotary motion, effectively controlling the rotation angle and swing frequency of the brush head, realizing the smooth transmission of the brush head, and meanwhile reducing the noise caused by the transmission process, and has the technical effect of convenient, fast and low-cost assembly.

DETAILED DESCRIPTION OF THE PREFERRED EMBODIMENT

In order to better understand the technical solutions of the present invention, the embodiments provided by the present invention are described in detail below with reference to the accompanying drawings.

Figure 1:
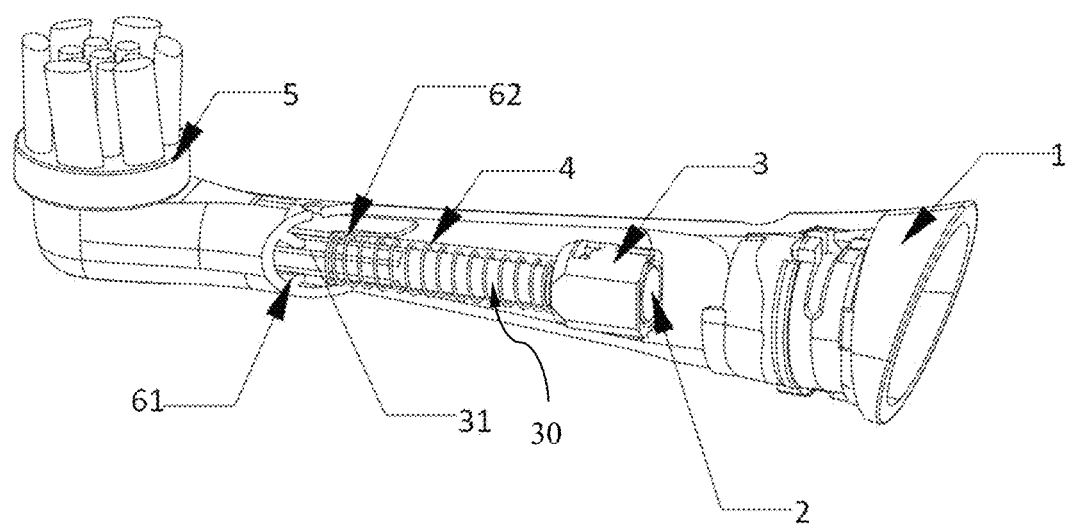
FIG. 1 is a schematic structural diagram of an internal transmission of a replacement brush head provided by the present invention.
Figure 2:
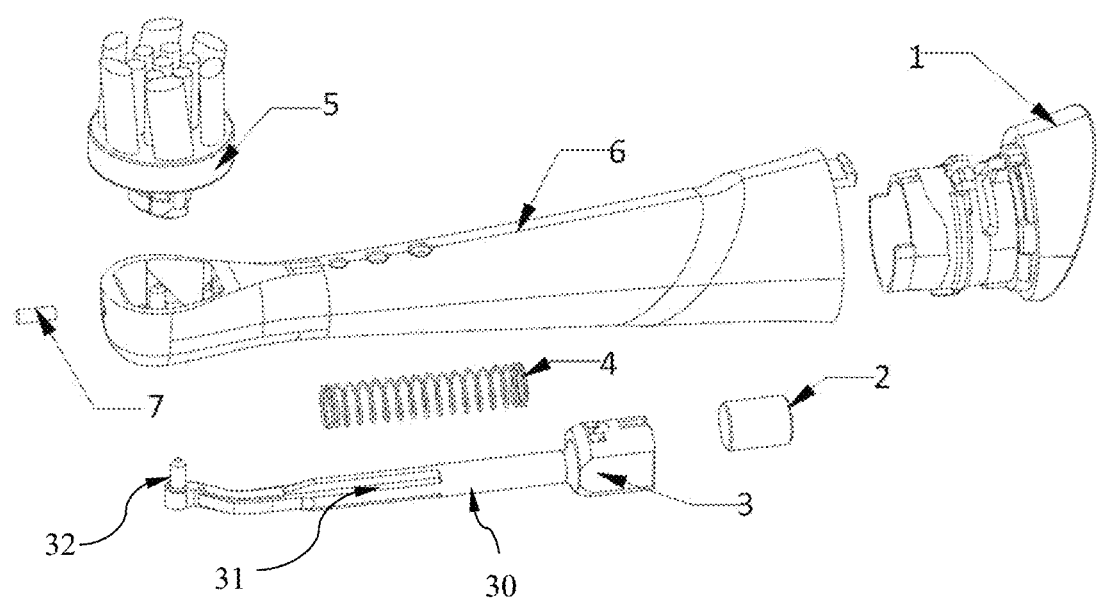
FIG. 2 is an exploded schematic diagram of the replacement brush head provided by the present invention.

The present invention provides a replacement brush head, as shown in FIGS. 1-2, comprising: a bristle head 5, a housing 6, a transmission shaft 3 and a tail cover 1, the transmission shaft 3 is arranged inside the housing 6, and the bristle head 5 is arranged in a transmission manner at a top end of the housing 6 through the transmission shaft 3, and the tail cover 1 is arranged at a tail end of the housing 6. On the basis of the above embodiment, in other embodiments, further, the transmission shaft 3 includes a transmission rod 30, a top end of the transmission rod 30 is provided with a transmission convex column 32, and the transmission rod 30 is provided with a cross guide groove 31, a damping spring 4 is sheathed on the transmission rod 30, and preferably, a guide rib 61 and a spring limiting rib 62 are provided on an inner side of the housing 6. The cross guide groove 31 of the transmission shaft and the guide rib 61 inside the outer cover prevent the transmission shaft from deflecting during its front-back reciprocating movement inside the replacement brush head, such that the transmission process is more stable. With the damping spring 4 sheathed on the transmission shaft 3, when the transmission shaft is assembled into the housing, the damping spring is in a compressed state due to the spring limiting rib 62 on an inner wall of the housing, so that the transmission shaft body is suspended inside the housing, and the transmission shaft will not collide with the inner wall of the housing during its high-frequency front-back movement, which can effectively reduce noise and make the transmission more stable. The damping spring 4 can effectively reduce the inertial kinetic energy generated by the high-frequency front-back transmission of the transmission shaft, and convert the kinetic energy into elastic potential energy, resulting in more stable transmission, effectively reducing the transmission noise, reducing the wear between the transmission shaft and the bristle head due to long-term transmission, and improving the service life.

Figure 3:
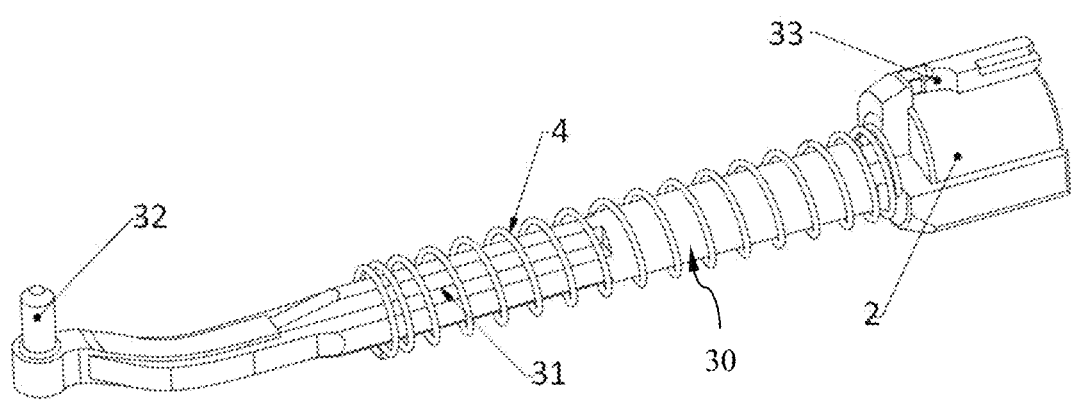
FIG. 3 is a schematic structural diagram of an internal transmission shaft of the replacement brush head provided by the present invention.
Figure 4:
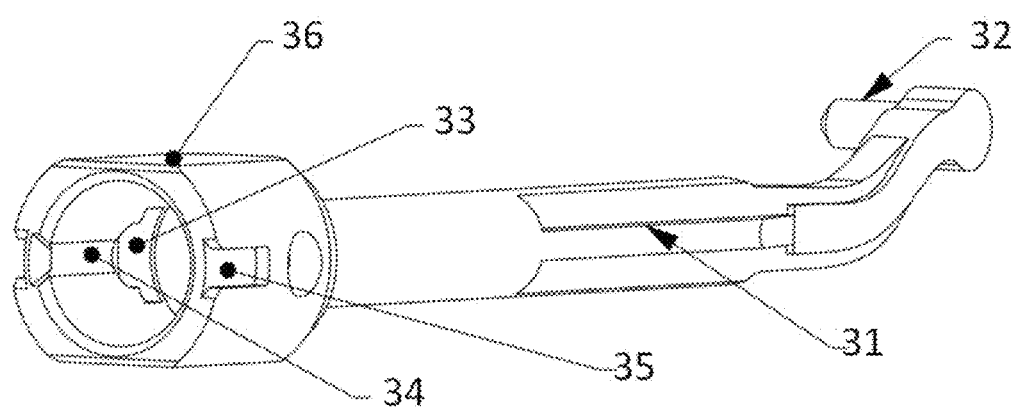
FIG. 4 is a schematic structural diagram of the internal transmission shaft of the replacement brush head provided by the present invention.
Figure 5:
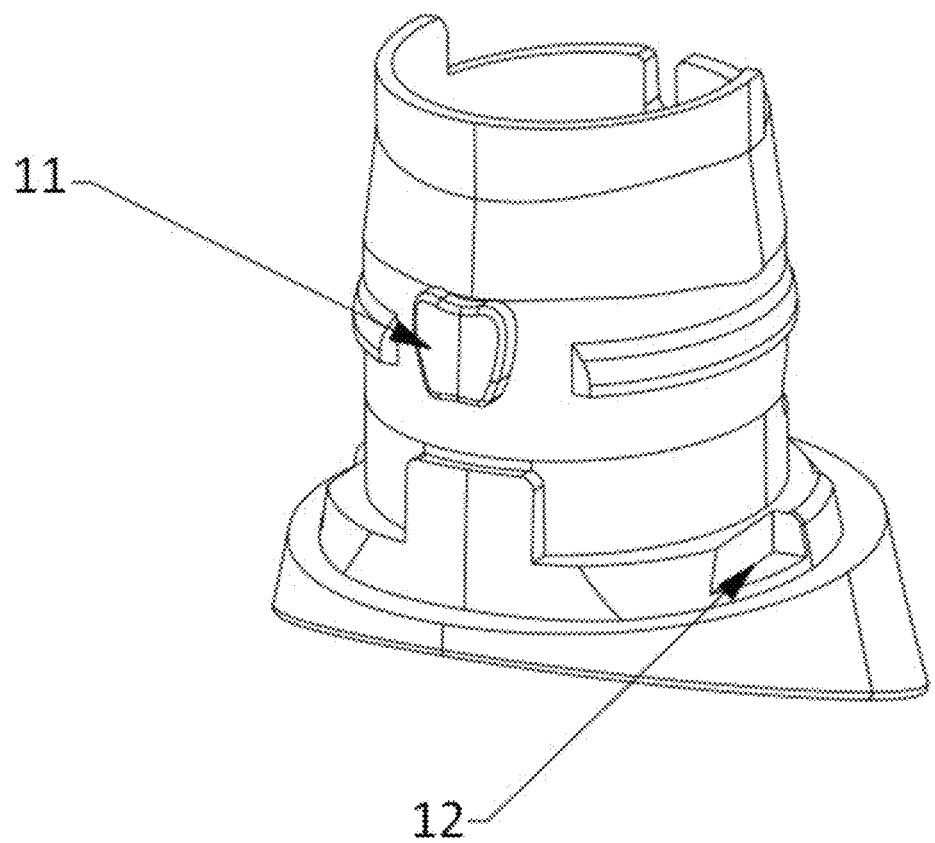
FIG. 5 is a schematic structural diagram (front view) of a tail cover of the replacement brush head provided by the present invention.
Figure 6:
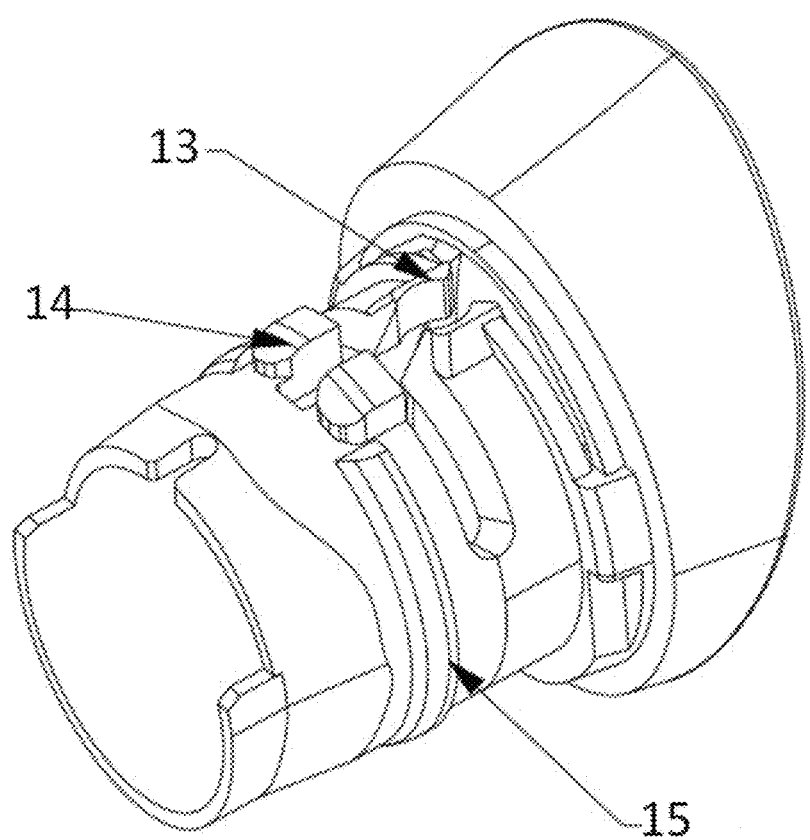
FIG. 6 is a schematic structural diagram (perspective view) of the tail cover of the replacement, brush head provided by the present invention.

On the basis of the above embodiment, in other embodiments, further, a tail end of the transmission rod 30 is composed of a peripheral wall and a cavity formed by the peripheral wall, and a plane limiter 36 is provided on an outer side of the peripheral wall, and an assembly positioning groove 35 is provided on an outer side surface adjacent to the plane limiter 36. As shown in FIGS. 3-4, the plane limiter 36 and the assembly positioning groove 35, at the tail of the transmission shaft, enable automatic production of the assembly process, improve production efficiency and reduce production cost. As shown in FIGS. 5-6, a convex point 11 and, a circle of ribs 15 are arranged on a middle wall of the tail cover body, which cause the tail cover to tightly fit with the housing. An elastic damping arm 13 on the tail cover realizes a better damping feel during a long-term replacement and pull-plug process of the handle 8 and the replacement brush head, so that the handle 8 and the replacement brush head fit more tightly. A front end of the elastic damping arm 13 is provided with a boss 14, and a recess 12 at a bottom of the tail cover and the boss 14 ensure that there will be no left-right offset during the assembly process of the tail cover and, the housing, and after the assembly, there will be no misalignment and the fit is more tightly, and the tail cover position and the housing position are effectively prevented from rotating. In this way, the entire oral hygiene device is ensured to be in the working state, the internal transmission is stable and does not shake, the use is more stable, and the replacement brush head housing remains stationary in the oral cavity, and only the bristle part of the brush head rotates, reducing transmission noise and improving user experience.

Figure 7:
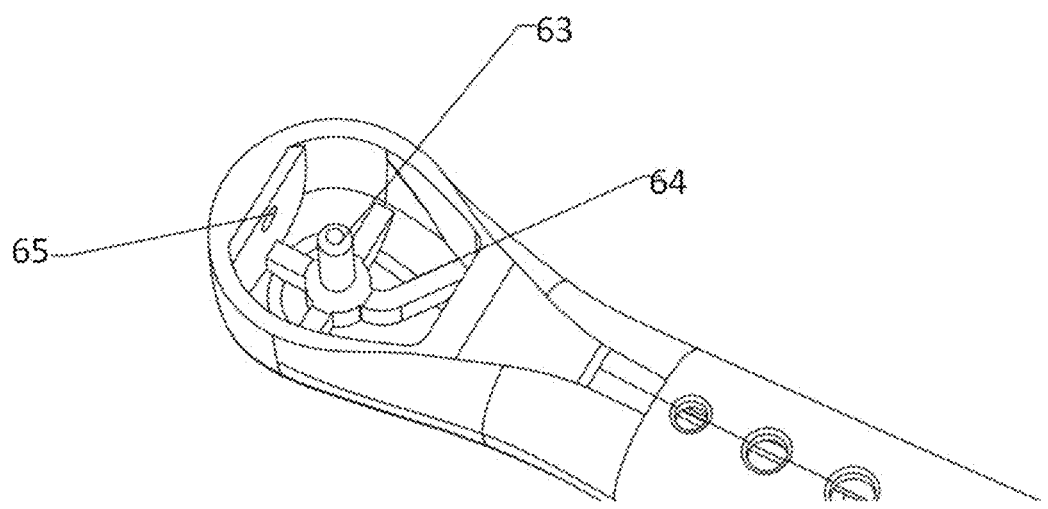
FIG. 7 is a schematic structural diagram of a top end of a housing of the replacement brush head provided by the present invention.
Figure 8:
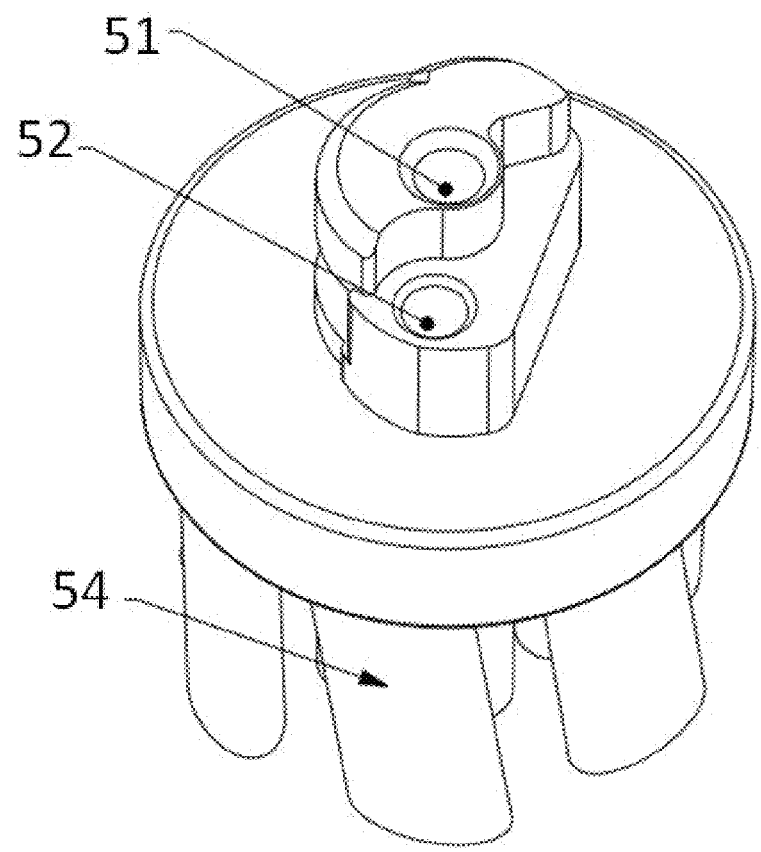
FIG. 8 is a schematic structural diagram (front view) of a bristle head of the replacement brush head provided by the present invention.
Figure 9:
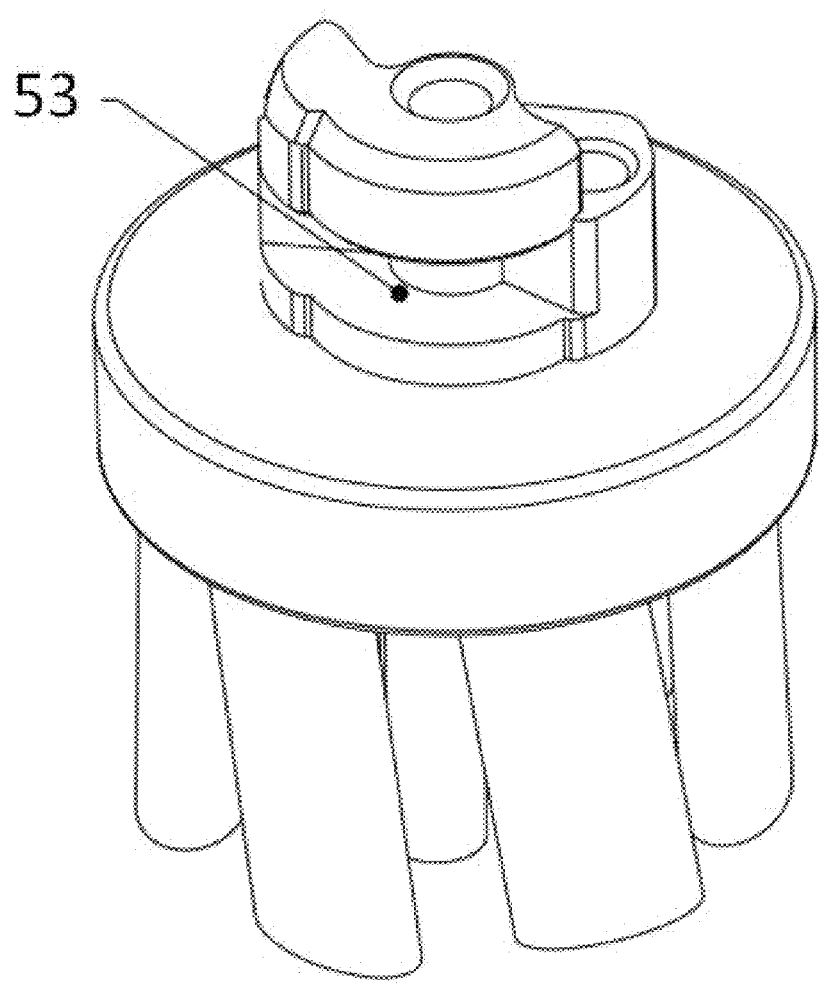
FIG. 9 is a schematic structural diagram (left view) of the bristle head of the replacement brush, head provided by the present invention.
Figure 10:
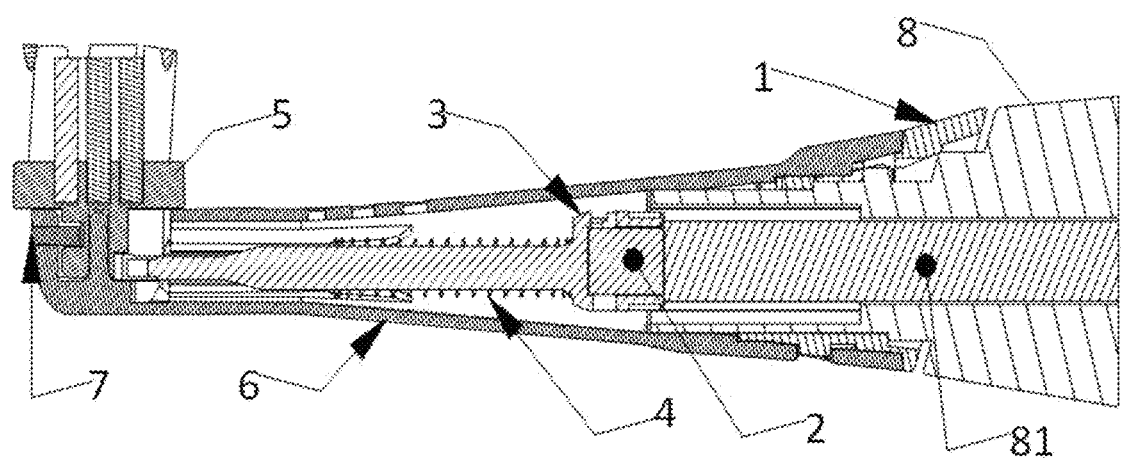
FIG. 10 is a schematic cross-sectional structural diagram of the replacement brush head provided by the present invention.

On the basis of the above embodiment, in other embodiments, further, as shown in FIGS. 5-6, the outer wall of the tail cover 1 is provided with a convex point 11 and a rib 15 on one side, and an elastic damping arm 13 and the boss 14 on the opposite side, and a recess 12 is provided at the bottom end of the tail cover 1. In this embodiment preferably, as shown in FIG. 7, the top end of the housing 6 is provided with a bristle head defining rib 64, a bristle head positioning column 63 and a fixing hole 65 at a connection with the bristle head 5. The bottom step of the bristle head 5 is provided with a central hole 51 and an eccentric transmission hole 52, a side of the step is provided with a limiting groove 53, and the bristle head is provided with soft bristles 54. As shown in FIGS. 2, 8-9, when the bristle head 5 is assembled on the housing, the central hole 51 of the bottom step of the bristle head is assembled with the positioning column 63 of the housing, so that the bristle head rotates and reciprocates around the positioning column 63 in the working state. The eccentric transmission hole 52 is assembled with the transmission convex column 32 of the transmission shaft, so that the front-back reciprocating motion of the transmission shaft is converted into a rotary motion through the transmission of an eccentric shaft. At the same time, a fixing nail 7 is inserted into the limiting groove 53 of the bristle head 5 through the fixing hole 65 of the housing, so that the bristle head does not jump during the swing working process and the transmission is more stable. The transmission convex column 32 at a front end of the transmission shaft cooperates with the eccentric transmission hole 52 of the bristle head to assemble the bristle head on the housing, and the transmission shaft drives the bristle head to rotate, thereby achieving the effect of cleaning the oral cavity.

Figure 11:
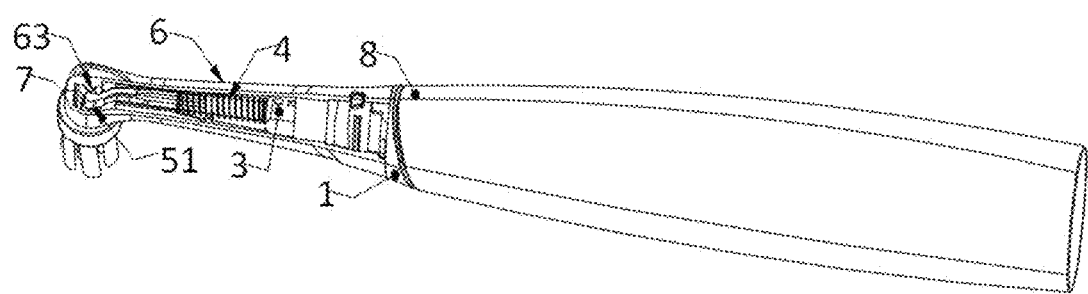
FIG. 11 is a schematic structural diagram of an oral hygiene device provided by the present invention.

This embodiment also provides an oral hygiene device, as shown in FIG. 11, comprising the replacement brush head of any of the above-mentioned embodiments, a magnetic electroplated iron block 2 and a handle 8, and the handle is provided therein with a handle transmission shaft 81, the handle transmission shaft 81 is connected to the replacement brush head in a transmission manner through the magnetic electroplated iron block 2. The transmission shaft is assembled with a magnetic electroplated iron block 2, as shown in FIGS. 1-2, and after the handle is assembled with the replacement brush head, the magnetic electroplated iron block 2 connects the handle transmission shaft 81 on the handle to the transmission shaft in a transmission manner, thereby driving the bristle head to swing. In this embodiment, preferably, a glue dispensing port 33 and a glue overflow groove 34 on the peripheral wall are configured such that the magnetic electroplated iron block 2 more stably arranged in the cavity at a tail end of the transmission shaft, and further, the magnetic electroplated iron block 2 and the transmission shaft are more closely connected to prevent the transmission shaft from falling off during transmission or generating abnormal noise due to assembly clearance. The oral hygiene device converts the linear motion of the transmission shaft device into the rotary motion, effectively controlling the rotation angle and swing frequency of the brush head, realizing the smooth transmission of the brush head, and meanwhile reducing the noise caused by the transmission process, and has the technical effect of convenient, fast and low-cost assembly.

A replacement brush head and an oral hygiene device provided by the embodiments of the present invention have been introduced in detail above. For those skilled in the art, according to concepts of the embodiments of the present invention, changes will be made in the specific implementation and application scope. In summary, the contents of this specification should not be construed as limiting the present invention.

What is claimed is:

1. A replacement brush head, comprising:
   a bristle head (5),
   a housing (6),
   a transmission shaft (3), and
   a tail cover (1), wherein the transmission shaft (3) is arranged inside the housing (6), the bristle head (5) is arranged in a transmission manner at a top end of the housing (6) through the transmission shaft (3), and the tail cover (1) is arranged at a tail end of the housing (6);
   wherein the transmission shaft (3) comprises a transmission rod (30), and the transmission rod (30) is provided with a guide groove (31); a guide rib (61) is arranged on an inner side of the housing (6); the guide rib (61) is configured to engage with the guide groove (31);
   wherein a damping spring (4) is sheathed on the transmission rod (30);
   wherein a spring limiting rib (62) is arranged on the inner side of the housing (6), the spring limiting rib (62) is configured to engage with the damping spring (4).

* * * * *